(12) United States Patent
Zalewski et al.

(10) Patent No.: US 10,213,691 B2
(45) Date of Patent: *Feb. 26, 2019

(54) SCHEMES FOR USING AUDIO UPDATES TO LINK REAL-LIFE EVENTS TO GAME EVENTS AFTER RELEASE OF THE GAME

(71) Applicant: Sony Interactive Entertainment America LLC, San Mateo, CA (US)

(72) Inventors: Gary M. Zalewski, Piedmont, CA (US); Scott Rohde, Poway, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,432

(22) Filed: Apr. 21, 2017

(65) Prior Publication Data

US 2017/0225078 A1 Aug. 10, 2017

Related U.S. Application Data

(63) Continuation of application No. 11/534,382, filed on Sep. 22, 2006, now Pat. No. 9,643,088.

(60) Provisional application No. 60/721,318, filed on Sep. 27, 2005.

(51) Int. Cl.
| | |
|---|---|
| A63F 13/65 | (2014.01) |
| A63F 13/25 | (2014.01) |
| A63F 13/32 | (2014.01) |
| A63F 13/327 | (2014.01) |
| A63F 13/33 | (2014.01) |
| A63F 13/332 | (2014.01) |
| A63F 13/335 | (2014.01) |
| A63F 13/352 | (2014.01) |

(52) U.S. Cl.
CPC ............ *A63F 13/65* (2014.09); *A63F 13/25* (2014.09); *A63F 13/32* (2014.09); *A63F 13/327* (2014.09); *A63F 13/33* (2014.09); *A63F 13/332* (2014.09); *A63F 13/335* (2014.09); *A63F 13/352* (2014.09); *A63F 2300/69* (2013.01)

(58) Field of Classification Search
CPC ......... A63F 13/65; A63F 13/25; A63F 13/327
See application file for complete search history.

(56) References Cited

U.S. PATENT DOCUMENTS

| | | |
|---|---|---|
| 6,165,073 A | 12/2000 | Miyamoto |
| 6,435,969 B1 * | 8/2002 | Tanaka ................... A63F 13/02 463/44 |
| 6,453,420 B1 | 9/2002 | Collart |
| 6,656,046 B1 | 12/2003 | Yoseloff |
| 6,944,621 B1 | 9/2005 | Collart |

(Continued)

OTHER PUBLICATIONS

Patent Cooperation Treaty; "International Preliminary Report on Patentability;" for corresponding PCT International Application No. PCT/US06/36441; dated Apr. 1, 2008; 7 pages.

(Continued)

*Primary Examiner* — Jason T Yen
(74) *Attorney, Agent, or Firm* — Fitch, Even, Tabin & Flannery LLP

(57) ABSTRACT

A method for use in presenting content includes the steps of generating an event in a software program and presenting content to a user in response to the event. The content may reflect one or more real-world events occurring after the software program has been released.

25 Claims, 3 Drawing Sheets

(56) References Cited

U.S. PATENT DOCUMENTS

| | | | |
|---|---|---|---|
| 9,643,088 B2 | 5/2017 | Zalewski | |
| 2002/0034980 A1 | 3/2002 | Lemmons | |
| 2003/0003988 A1 | 1/2003 | Walker | |
| 2003/0054885 A1* | 3/2003 | Pinto | A63F 13/12 463/42 |
| 2003/0117938 A1 | 6/2003 | Braitberg | |
| 2004/0067788 A1* | 4/2004 | Angelopoulos | A63F 13/10 463/1 |
| 2004/0248630 A1 | 12/2004 | Hodgson | |
| 2004/0255236 A1 | 12/2004 | Collart | |
| 2005/0256845 A1* | 11/2005 | Jen | G06F 17/30017 |
| 2006/0181965 A1 | 8/2006 | Collart | |
| 2006/0211493 A1 | 9/2006 | Walker | |
| 2006/0258446 A1 | 11/2006 | Nguyen | |
| 2007/0072681 A1 | 3/2007 | Zalewski | |

OTHER PUBLICATIONS

Patent Cooperation Treaty; "International Search Report;" for corresponding PCT International Application No. PCT/US06/36441; dated Jul. 31, 2007; 2 pages.

Patent Cooperation Treaty; "Notification Concerning Transmittal of International Preliminary Report on Patentability" for corresponding PCT International Application No. PCT/US06/36441; dated Apr. 10, 2008; 1 page.

Patent Cooperation Treaty; "Notification of Transmittal of the International Search Report and the Written Opinion of the International Searching Authority, or the Declaration;" for corresponding PCT International Application No. PCT/US06/36441; dated Jul. 31, 2007; 1 page.

Patent Cooperation Treaty; "Written Opinion of the International Searching Authority," for corresponding PCT Application No. PCT/US06/36441, dated Jul. 31, 2007; 6 pages.

USPTO; Advisory Action issued in U.S. Appl. No. 11/534,382, dated May 18, 2011, 3 pages.

USPTO; Final Office Action issued in U.S. Appl. No. 11/534,382, dated Mar. 2, 2015, 10 pages.

USPTO; Final Office Action issued in U.S. Appl. No. 11/534,382, dated Mar. 3, 2011, 15 pages.

USPTO; Final Office Action issued in U.S. Appl. No. 11/534,382, dated May 14, 2014, 9 pages.

USPTO; Final Office Action issued in U.S. Appl. No. 11/534,382, dated Nov. 27, 2009, 14 pages.

USPTO; Notice of Allowability issued in U.S. Appl. No. 11/534,382, dated Feb. 6, 2017, 4 pages.

USPTO; Notice of Allowance issued in U.S. Appl. No. 11/534,382, dated Jan. 4, 2017, 5 pages.

USPTO; Notice of Panel Decision from Pre-Appeal Brief Review issued in U.S. Appl. No. 11/534,382, dated Jun. 25, 2015, 2 pages.

USPTO; Office Action issued in U.S. Appl. No. 11/534,382, dated Feb. 23, 2009, 13 pages.

USPTO; Office Action issued in U.S. Appl. No. 11/534,382, dated Feb. 5, 2014, 8 pages.

USPTO; Office Action issued in U.S. Appl. No. 11/534,382, dated Jul. 3, 2013, 8 pages.

USPTO; Office Action issued in U.S. Appl. No. 11/534,382, dated Jul. 31, 2014, 9 pages.

USPTO; Office Action issued in U.S. Appl. No. 11/534,382, dated Jun. 20, 2016, 7 pages.

USPTO; Office Action issued in U.S. Appl. No. 11/534,382, dated Oct. 7, 2015, 5 pages.

USPTO; Office Action issued in U.S. Appl. No. 11/534,382, dated Sep. 15, 2010, 13 pages.

* cited by examiner

SCHEMES FOR USING AUDIO UPDATES TO LINK REAL-LIFE EVENTS TO GAME EVENTS AFTER RELEASE OF THE GAME

CROSS-REFERENCE TO RELATED APPLICATIONS

This application is a continuation of U.S. patent application Ser. No. 11/534,382, filed on Sep. 22, 2006, entitled "SCHEMES FOR USING AUDIO UPDATES TO LINK REAL-LIFE EVENTS TO GAME EVENTS AFTER RELEASE OF THE GAME," which claims the benefit of U.S. Provisional Patent Application No. 60/721,318, filed on Sep. 27, 2005, entitled "TOPICAL CONTENT FOR ENTERTAINMENT SOFTWARE," the entire content and disclosures of which are both hereby fully incorporated by reference herein in their entireties.

BACKGROUND OF THE INVENTION

1. Field of the Invention

The present invention relates generally to software, and more specifically to the field of entertainment software.

2. Discussion of the Related Art

Entertainment software typically includes a large amount of audio, video, and other informational content. This content is produced during the development of the entertainment software. Typically, this content remains fixed once the entertainment software has been completed and is released for sale.

It is with respect to these and other background information factors that the present invention has evolved.

SUMMARY OF THE INVENTION

One embodiment provides a system for retrieving and presenting event responses, the system comprising: an event processing module adapted to receive events generated in response to changes in a game state and to match event responses with the events; a dynamic event response storage adapted to store event responses; and an event response update module adapted to retrieve an event response from an event response server and to store the event response in the dynamic event response storage.

Another embodiment provides a method of retrieving and presenting event responses, the method comprising: contacting an event response server; retrieving an event response from the event response server; storing the event response in an event response storage; receiving an event generated in response to a change in game state; selecting at least one event response from the event response storage; evaluating the selected event responses for suitability of presentation to a user in response to the event; and presenting content associated with at least one of the selected event responses to the user in response to the evaluation of the selected event responses.

Another embodiment provides an information storage medium having a plurality of instructions adapted to direct an information processing device to perform steps including: contacting an event response server; retrieving an event response from the event response server; storing the event response in an event response storage; receiving an event generated in response to a change in game state; selecting at least one event response from the event response storage; evaluating the selected event responses for suitability of presentation to a user in response to the event; and presenting content associated with at least one of the selected event responses to the user in response to the evaluation of the selected event responses.

Another embodiment provides a method for use in presenting content, comprising the steps of: generating an event in a software program; and presenting content to a user in response to the event; wherein the content reflects one or more real-world events occurring after the software program has been released.

Another embodiment provides a computer program product comprising a medium for embodying a computer program for input to a computer and a computer program embodied in the medium for causing the computer to perform steps of: generating an event; and presenting content to a user in response to the event; wherein the content reflects one or more real-world events occurring after the computer program has been released.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Figure 1:
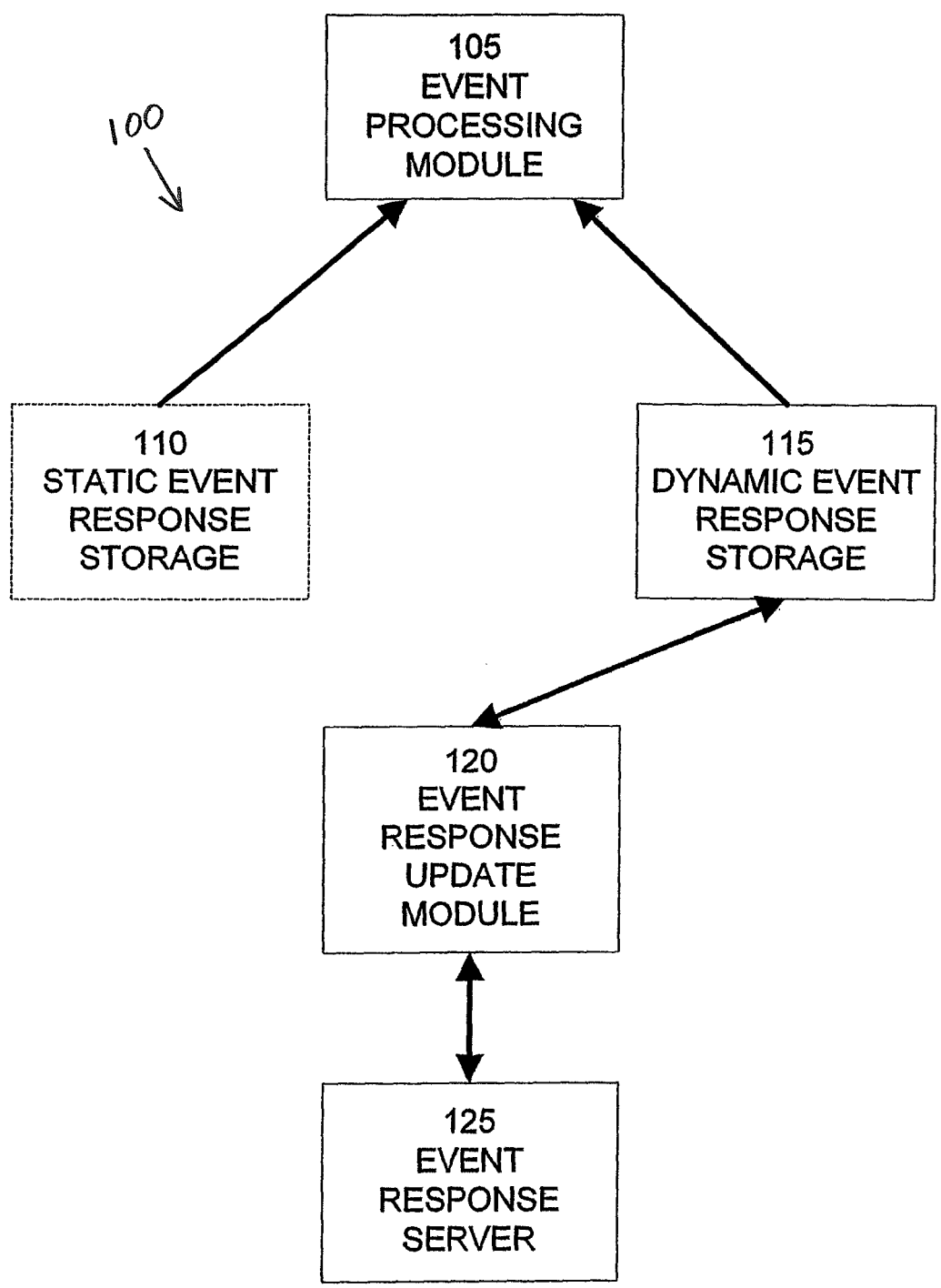
FIG. 1 illustrates a system of dynamically updating entertainment software content according to an embodiment of the present invention.

Entertainment software often maintains a game state that represents the state of the user within a game and the game entities that interact with the user. In some types of entertainment software, content is presented to a user in response to events. The entertainment software generates events in response to changes in the game state, such as the interaction of game entities with each other or the user, the user satisfying some type of criteria, predetermined or random inputs to the game state, and/or interactions with other local or remote users. In response to these events, the entertainment software can select and present content to the user.

In some genres of entertainment software, developers strive for verisimilitude. For example, many sports-related entertainment software applications replicate the minutia of professional sports leagues and sports broadcasting to make user experiences as close to their real-life counterparts as possible. Because of the close relationship between these genres of entertainment software and real-world counterparts, some or all of the content may become obsolete following the completion of the entertainment software due to subsequent real-life events. Additionally, because the content remains fixed once the entertainment software is produced, the entertainment software content does not reflect real-life events subsequent to the completion of production of the entertainment software.

It is therefore desirable for a system and method that allows a video game to be dynamically updated with content reflecting real-world events, where the real-world events are typically occurring after the game has been released, and where the game can release the current or up-to-date dynamic content in response to events that take place in the game.

As such, one embodiment of the present invention provides a method for use in presenting content. In this method an event is generated in a software program, such as for example an entertainment software program. Content is presented to a user in response to the event. The content may reflect one or more real-world events occurring after the software program has been released.

In some embodiments of the present invention, entertainment software may include an event response update module that retrieves event responses and associated content that references recent real-life events. An event processing engine tracks events that take place in a game state and selects at least one event response to the user matching the event. Event responses may be evaluated using a variety of criteria and selection schemes to determine if they should be presented to the user. The event processing module may specify content associated with one or more event responses to be presented to users. Event responses may include audio, video, text, or other types of data.

In another embodiment, a system for retrieving and presenting dynamic event responses comprises an event processing module adapted to receive events. Events are generated in response to changes in a game state. The event processing module may also be adapted to match event responses with the events. The system may also include a dynamic event response storage adapted to store event responses and an event response update module adapted to retrieve an event response from an event response server and to store the event response in the dynamic event response storage.

Event responses may include content adapted for presentation to a user. In some embodiments, the content may include audio data, video data, and/or text data. In a further embodiment, the event response may include criteria adapted to assist in the matching of the event response with at least one event.

FIG. 1 illustrates a system 100 of dynamically updating entertainment software content according to an embodiment of the present invention. In this embodiment, the content includes audio, video, pictures, text, or other data that is presented to the user. System 100 may include an event processing module 105 that receives events generated in response to changes in the game state. In response to events, the event processing module 105 retrieves one or more static event responses from static event response storage 110. A static event response is an event response that includes content that cannot be changed or modified. Prior art games utilize static event responses based on content that is fixed at the time the development of game.

In some embodiments, the static event response storage 110 may include a non-volatile storage medium, such as a magnetic or optical disk, for storing content associated with static event responses. In further embodiments, some or all of the content associated with static event responses can be loaded into a volatile memory, such as common varieties of static and dynamic random access memory (SRAM and DRAM), temporarily to facilitate presentation of the static event response content to the user.

In some embodiments, system 100 may also include dynamic event response storage 115. Dynamic event response storage 115 may be adapted to provide dynamic event responses to the event processing module 105 in response to events. Dynamic event responses are event responses that can be added, deleted, or modified at any time during or following the development and release of the entertainment software application. Dynamic event responses can include content, such as audio, video, pictures, text, or other data, created at any time during or following the development of the entertainment software application.

In some embodiments, the dynamic event response storage 115 may include a writeable non-volatile storage medium, such as magnetic disk, flash memory, or writeable optical disk, for storing dynamic event responses and associated content. In another embodiment, the dynamic event response storage 115 may comprise a volatile memory device, such as common varieties of static and dynamic random access memory (SRAM and DRAM). In these embodiments, dynamic event responses are loaded into the dynamic event response storage 115 each time the system 100 is turned on.

In some embodiments, event responses may include audio, video, pictures, text, or other data that is presented to the user. In addition, event responses can include other data, such as event criteria, used to match events with event responses; event response start and end dates, used to determine time periods when event responses can or cannot be used; and event response priority and usage information, used to select at least one event response to present to users when one or more static and/or dynamic event responses match an event.

In some embodiments, event response update module 120 may be adapted to retrieve dynamic event responses from event response server 125 and to store, modify, and/or delete event responses from dynamic event response storage 115. In some embodiments, event response update module 120 may communicate with the event response server 125 via a wired and/or wireless, local and/or wide area data communications network. In a further embodiment, event response update module 120 may interact with the event response server 125 to identify and/or authenticate the user and to optionally charge the user for dynamic event responses. In some embodiments, the event response update module 120 can periodically check with the event response server 125 for new dynamic event responses. In a further embodiment, the event response server 125 can send messages to the event response update module 120 whenever new dynamic event responses are available for downloading.

Dynamic event responses can be used to provide a variety of topical content to users of entertainment software. For example, many sports-related video games include prerecorded audio tracks that can be combined to provide a play-by-play audio commentary on the user's game play. Dynamic event responses can be used to supplement these audio tracks, thereby providing a greater variety of audio commentary. In a further example, dynamic event responses can be used to ensure that audio commentary is topical and reflects current events. For example, when a game event occurs, such as two baseball players colliding in the outfield while chasing a ball, a dynamic event response referring a similar recent real-life occurrence can be presented to the user.

For example, on Aug. 11, 2005, New York Mets outfielders Carlos Beltran and Mike Cameron were involved in one of the most horrible collisions seen in baseball. As they both raced for a line drive to right center field, they collided face to face, knocking each other to the ground. Both laid motionless in front of the crowd at PETCO Park as Padres fans watched silently from the stands. Beltran was eventually able to walk off the field on his own while Cameron had to be carried off in a stretcher after lying motionless in the outfield for several minutes. Images of the collision were repeated on news stations throughout the country and world.

Baseball fans who play baseball video games would greatly appreciate if, shortly after the above collision, their video game was updated with broadcaster or announcer audio segments to enable their game to relate events in the game to the above incident. For example, if a video game player is injured, the game can provide commentary connecting the injury in the game to the Met's collision, using newly recorded announcer audio clips. Prior-art games typically have pre-determined generic audio segments created at the time the game was developed that are randomly chosen for an injury, such as for example, "ouch that must have hurt", "a real stinger", etc. However, embodiments of the present invention would also allow the game to say, for example: "Do you remember yesterday's collision between Met's outfielders", "Beltran suffered a concussion and a minor facial fracture, but will not need surgery", "Cameron on the other hand suffered multiple injuries and will need surgery to repair facial fractures," etc. Embodiments of the present invention may also bring in video clips highlights of the game and relate that content to current events that take place in the game.

In another example, dynamic event responses can be used to present information such as scores on ongoing or recent real-life sporting events.

The above described modules of system 100 can be implemented in a variety of combinations of hardware and software. For example, system 100, with the exception of event response server 125, can be implemented within a entertainment software application executed by a video game console, computer, or other information processing device. In another example, some or all of the modules of system 100 can be implemented as operating system, system library, or firmware functions of a video game console, computer, or other information processing device.

Figure 2:
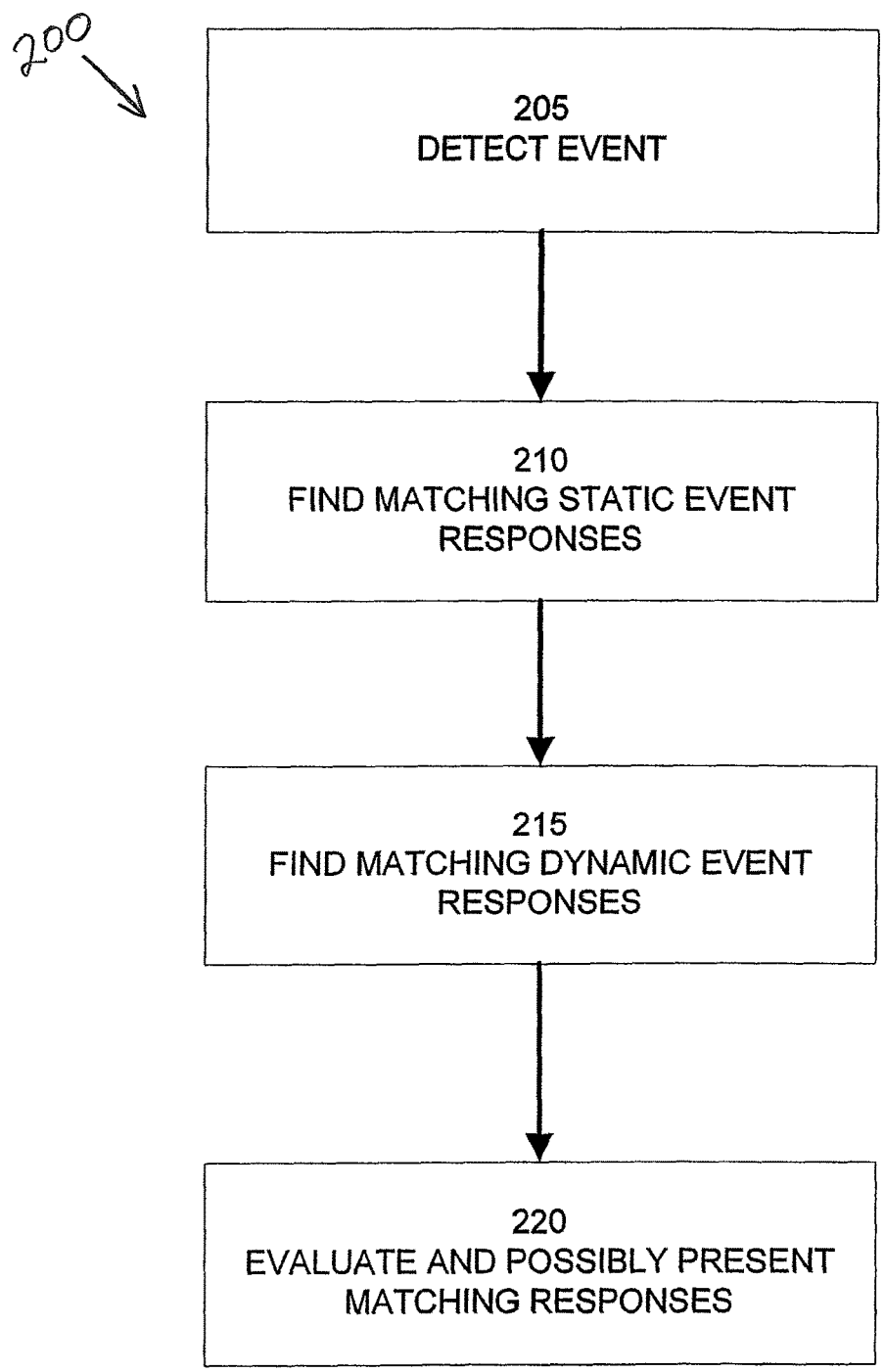
FIG. 2 illustrates a method of selecting static and dynamic entertainment software content according to an embodiment of the present invention.

FIG. 2 illustrates a method 200 of selecting static and dynamic entertainment software content according to an embodiment of the present invention. At step 205, an event is detected. Optional step 210 searches static event response storage for static event responses matching the event. In some embodiments, the event may be matched with zero, one, or more static event responses according to event criteria associated with the static event responses. These matching event responses, if any, are selected for further evaluation.

Step 215 searches dynamic event response storage for dynamic event responses matching the event. In some embodiments, the event may be matched with zero, one, or more dynamic event responses according to event criteria associated with the dynamic event responses. These matching event responses, if any, may be selected for further evaluation.

Step 220 evaluates the selected dynamic and/or static event responses to determine if one or more of the selected event responses should be presented to the user. Selected event responses may be evaluated using a variety of criteria and selection schemes to determine if they should be presented to the user. Examples of these schemes include random or ordered schemes (such as round-robin or least recently used event responses); priority schemes for presenting event responses determined to be more important than other selected event responses; suitability or relevance schemes for presenting event responses determined to be more relevant to the event; and weighting schemes to evaluate combinations of event responses' criteria, strengths of matches between the event and event responses, the types of content associated with event responses, and other factors.

Based on the results of the evaluation, some embodiments of step 220 may present zero, one, or more event responses to the user. Event responses can be presented to the user in the same manner as any other content of a similar type. For example, event responses with audio content can be presented to the user by playing the audio content. In another example, video, pictures, text, or other types of content associated with event responses can be presented to users directly (for example by displaying the content full-screen, in a window or as an overlay on other game displays) or indirectly (for example by integrating the content onto signs, walls, or other objects within the game world).

Figure 3:
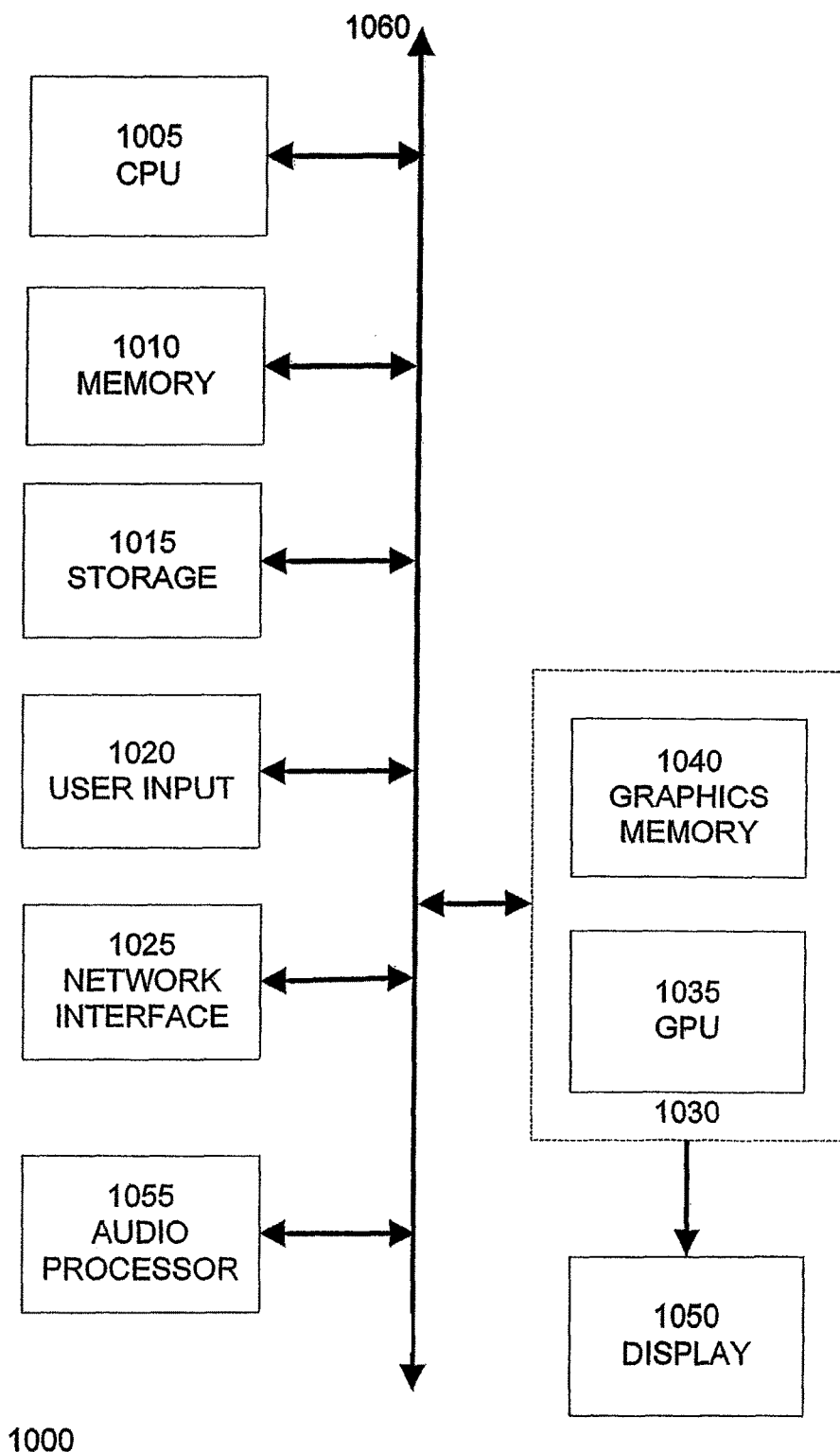
FIG. 3 illustrates an example computer system suitable for implementing an embodiment of the present invention.

FIG. 3 illustrates an example computer system 1000 suitable for implementing an embodiment of the present invention. FIG. 3 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 may include a graphics processing unit (GPU) 1035 and graphics memory 1040. Graphics memory 1040 may include a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 may provide the GPU 1035 with data and/or instructions defining the desired output images, from which the GPU 1035 generates the pixel data of one or more output images. The data and/or instructions defining the desired output images can be stored in memory 1010 and/or graphics memory 1040. In some embodiments, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 may periodically output pixel data for an image from graphics memory 1040 to be displayed on display device 1050. Display device 1050 may comprise any device capable of displaying visual information in response to a signal from the computer system 1000, including CRT, LCD, plasma, and OLED displays. Computer system 1000 can provide the display device 1050 with an analog or digital signal.

Thus, in some embodiments of the present invention entertainment software may include an event response update module that retrieves event responses and associated content that references recent real-life events. An event processing engine may receive events generated in response to changes in the game state and selects at least one event response to the user matching the event. Event responses can be evaluated using a variety of criteria and selection schemes to determine if they should be presented to the user. The event processing module may specify content associated with one or more event responses to be presented to users. By way of example, event responses can include audio, video, text, or other types of data.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for retrieving and presenting event responses, the system comprising:
 a dynamic event response storage, comprising a computer memory device, adapted to store event responses;
 an event response update module adapted to update the event responses in the dynamic event response storage; and
 an event processing module implemented on a processor and adapted to:
  receive an event generated in a computer simulated game on a computer system in response to changes in a game state during play of the computer simulated game;
  select at least one event response from the dynamic event response storage based on the event; and
  present, in the computer simulated game on the computer system, an audio track of the at least one event response to a user, wherein the audio track comprises spoken commentary of the event generated in the computer simulated game and the spoken commentary references a real world event occurring after a software program for implementing the computer simulated game has been released; and
  wherein the at least one event response is updated in the dynamic event response storage after the real world event and before the event generated in the computer simulated game.

2. The system of claim 1, wherein one or more of the events responses comprise video data.

3. The system of claim 1, wherein one or more of the event responses comprise text data.

4. The system of claim 1, wherein the event responses comprise criteria adapted to assist in the matching of the event responses with events.

5. The system of claim 4, wherein the event processing module is further adapted to present content associated with the event responses to the user in response to the criteria of the event responses corresponding with criteria of events.

6. A method of retrieving and presenting event responses comprising:
 storing event responses in a dynamic event response storage comprising a computer memory device;
 receiving an event generated in response to a change in game state of a computer simulated game during play of the computer simulated game on a computer system;
 selecting, with a processor, at least one event response from the dynamic event response storage based on the event; and
 presenting, in the computer simulated game on the computer system, an audio track of the at least one event response to a user, wherein the audio track comprises spoken commentary of the event generated in the computer simulated game and the spoken commentary references a real world event occurring after a software program for implementing the computer simulated game has been released;
 wherein the at least one event response is updated in the dynamic event response storage after the real world event and before the event generated in the computer simulated game.

7. The method of claim 6, further comprising:
 receiving an event update message from an dynamic event response server; and
 removing a previously stored event response from the dynamic event response storage in response to the event update message.

8. The method of claim 6, wherein one or more of the event responses comprise video data.

9. The method of claim 6, wherein one or more of the event responses comprise text data.

10. The method of claim 6, wherein selecting the at least one event response comprises comparing the event with the criteria associated with the at least one event response.

11. The method of claim 6, wherein selecting the at least one event response comprises comparing priority schemes associated with the at least one event response.

12. An information storage medium having a plurality of instructions adapted to direct an information processing device to perform steps comprising:
 storing event responses in a dynamic event response storage comprising a computer memory device;
 receiving an event generated in response to a change in game state of a computer simulated game during play of the computer simulated game on a computer system;
 selecting, with a processor, at least one event response from the dynamic event response storage based on the event; and
 presenting, in the computer simulated game on the computer system, an audio track of the at least one event response to a user, wherein the audio track comprises spoken commentary of the event generated in the computer simulated game and the spoken commentary references a real world event occurring after a software program for implementing the computer simulated game has been released;

wherein the at least one event response is updated in the dynamic event response storage after the real world event and before the event generated in the computer simulated game.

13. The information storage medium of claim 12, further comprising:

receiving an event update message from an event response server; and removing a previously stored event response from the dynamic event response storage in response to the event update message.

14. The information storage medium of claim 12, wherein one or more of the event responses comprise video data.

15. The information storage medium of claim 12, wherein one or more of the event responses comprise text data.

16. The information storage medium of claim 12, wherein selecting the at least one event responses comprises comparing the event with the criteria associated with the at least one event response.

17. The information storage medium of claim 12, wherein selecting the at least one event response comprises comparing priority schemes associated with the at least one event response.

18. A method for use in presenting content, comprising the steps of:

generating an event in a software program in response to a change in a game state of a computer simulated game during play of the computer simulated game on a computer system;

matching the event to at least one event response of event responses stored in a dynamic event response storage;

presenting, in the computer simulated game on the computer system, an audio track of the at least one event response to a user in response to the at least one event response being matched to the event, wherein the audio track comprises spoken commentary of the event generated in the computer simulated game and the spoken commentary references a real world event occurring after the software program has been released; and wherein the at least one event response is updated in the dynamic event response storage after the real world event and before the event generated in the computer simulated game.

19. The method of claim 18, further comprising the step of:

updating the event responses by retrieving updated content from an event response server.

20. The method of claim 18, wherein the event responses include criteria adapted to assist in the matching of the event responses with the event.

21. The method of claim 18, further comprising the step of:

evaluating one or more event responses for suitability of presentation to the user in response to the event.

22. A computer program product comprising a medium for embodying a computer program for input to a computer and a computer program embodied in the medium for causing the computer to perform steps comprising:

generating an event in a software program in response to a change in a game state of a computer simulated game during play of the computer simulated game on a computer system;

matching the event to at least one event response of event responses stored in an dynamic event response storage;

presenting, in the computer simulated game on the computer system, an audio track of the at least one event response to a user in response to the at least one event response being matched to the event, wherein the audio track comprises spoken commentary of the event generated in the computer simulated game and the spoken commentary references a real world event occurring after the software program has been released; and wherein the at least one event response is updated in to the dynamic event response storage after the real world event and before the event generated in the computer simulated game.

23. The computer program product of claim 22, wherein the computer program embodied in the medium is further configured for causing the computer to perform the step comprising:

updating the event responses by retrieving updated content from an event response server.

24. The computer program product of claim 22, wherein the event responses include criteria adapted to assist in the matching of the event responses with the event.

25. The computer program product of claim 22, further comprising the step of:

evaluating one or more event responses for suitability of presentation to the user in response to the event.

* * * * *